United States Patent [19]

Cullum et al.

[11] Patent Number: 5,502,522
[45] Date of Patent: Mar. 26, 1996

[54] COMPACT MAGNETIC HEAD FOR A PHOTOGRAPHIC CAMERA

[75] Inventors: Dennis F. Cullum, Leucadia, Calif.; Fernando G. Silva, Rochester, N.Y.

[73] Assignee: Eastman Kodak Company, Rochester, N.Y.

[21] Appl. No.: 241,535

[22] Filed: May 12, 1994

[51] Int. Cl.⁶ ................................... G03B 17/24
[52] U.S. Cl. ................................... 354/106
[58] Field of Search ................... 354/76, 105, 106; 360/1, 110, 121, 123, 125

[56] References Cited

U.S. PATENT DOCUMENTS

| | | | |
|---|---|---|---|
| 2,673,248 | 3/1954 | Hamberg | 360/125 X |
| 2,969,529 | 1/1961 | Gilson | 360/123 X |
| 2,995,631 | 8/1961 | Rubens | 360/123 |
| 3,881,194 | 4/1975 | Heaslett et al. | 360/123 |
| 4,878,075 | 10/1989 | Cannon | 354/106 X |
| 4,933,780 | 6/1990 | Wash et al. | 360/1 |
| 4,965,626 | 10/1990 | Robison et al. | 354/106 X |
| 4,977,419 | 12/1990 | Wash et al. | 354/76 |
| 5,006,873 | 4/1991 | Wash | 354/106 |
| 5,097,372 | 3/1992 | Fukazawa et al. | 360/113 |
| 5,130,728 | 7/1992 | Goto et al. | 354/105 |
| 5,181,058 | 1/1993 | Egawa | 354/105 |
| 5,321,452 | 6/1994 | Tsujimoto | 354/106 |

*Primary Examiner*—Howard B. Blankenship
*Assistant Examiner*—J. K. Han
*Attorney, Agent, or Firm*—Peter J. Bilinski

[57] ABSTRACT

A magnetic head for a camera having a first track-forming portion, and an adjacent second track-forming portion wherein each track-forming portion is capable of either writing to or reading from a magnetic-memory portion of a film loaded in the camera and having a path of travel adjacent the head. According to the invention, the track-forming portion having read capability has a major dimension which is parallel to the plane of the film to allow an additional number of turns of wire to be wound without increasing the size of the camera. In addition, the second track-forming portion is preferably arranged furthest from the edge of the photographic image region of the film.

2 Claims, 5 Drawing Sheets

COMPACT MAGNETIC HEAD FOR A PHOTOGRAPHIC CAMERA

FIELD OF THE INVENTION

The invention relates generally to the field of photography, and in particular to a camera for use with a film having a magnetic-memory region. Specifically, the invention relates to a magnetic-head configuration that permits writing to and reading from magnetic-track positions on a film without significantly increasing the size of the camera.

BACKGROUND OF THE INVENTION

U.S. Pat. No. 4,977,419 discloses a type of photographic film having a transparent magnetic layer that covers the entire side of the film base opposite to that of the photosensitive layer, and a type of camera that is equipped with a magnetic head for writing to and reading from the magnetic layer. The head is used to record information about each picture taken on several tracks that are located outside of the image area of the film. Examples of the information that may be recorded include the date and time of the exposure, roll and frame titles, type of illuminant used, pseudo-zoom information, and other photographic information such as shutter speed and lens aperture value.

U.S. Pat. No. 4,878,075 discloses a type of film having magnetically prerecorded information about the attributes of a specific strip of the film, such as photographic speed and number of photographic frames present. It also discloses a type of camera that reads this information from the film prior to a picture-taking event and then rewrites it, along with the kind of information relating to the picture-taking event that is described above, after the picture-taking event when the film is being wound to the next frame. The camera writes information on a track of each exposed frame indicating that the frame has been exposed ("exposed information"), and then advances the film to the next available unexposed frame to resume exposure of the roll.

In order to fully realize the potential capacity of a film having a magnetic-memory region, magnetic heads used for the above purposes are required which are capable of writing to and reading from a roll of film that has been loaded into a camera. Preferably, these magnetic heads should possess one track-forming portion that has the capability to both write information to and read information from the magnetic memory portion of the film, and at least one additional track-forming portion that has only write capability. In addition, the track-forming portions should be sufficiently small so that any increase in the size of the camera due to the presence of the magnetic heads is minimized.

The design of conventionally known wirewound inductive magnetic heads, such as those described above, is made difficult by the requirement that they read information recorded on film. In general, the following expression holds for the signal output from such a magnetic head:

$$V = k \times D \times N \times W \times v$$

in which:

k is a constant;

D is a constant proportional to the dispersion of the magnetic layer;

N is the number of turns in the sensing coil that is wound on the core;

W is the width of the core at the location that defines the magnetic track; and v is the speed at which the magnetic media passes by the magnetic head.

Each of the above parameters are restricted in the following ways: First, in a camera operating with magnetically treated film, the magnetic layer is typically dispersed along the entire film base on the side opposite to the photosensitive side of the film, such as the one referred to in the '419 patent. In order not to degrade the image quality of the film, this layer is usually transparent, therefore, it should preferably contain a very dilute dispersion of magnetic particles. This produces a value of D which is small.

The widths of the magnetic tracks should be as small as possible, since they are preferably located in an area which is outside of the frame area of the film (and is a region preferably minimized in order to minimize the width of the film) while maximizing the amount of information stored by providing as many tracks as possible. Therefore, W is small.

The film typically is transported at low speeds, on the order of about 100 mm/second, due to limitations on the power available from battery packs internal to the camera. Therefore, v is also small.

Furthermore, the magnetic head of necessity is typically located near to sources of electromagnetic interference ("noise") such as the film winding motor. Therefore, the signal-to-noise ratio produced by the magnetic head is low, which results in a poor reliability of reading information from the film in the camera. Under these conditions, it is apparent that a head with a large number of turns is required to produce an output level sufficient to provide an adequate signal to noise ratio. Increasing the number of turns in a conventional head structure, as shown in FIG. 1 can only be accomplished by increasing the dimension "H". Such an increase is inconsistent with the requirement of keeping the camera size to a minimum.

SUMMARY OF THE INVENTION

The present invention is directed to overcoming one or more of the problems set forth above. Briefly summarized, according to one aspect of the present invention, there is provided a magnetic head for a camera for use with film having a magnetic memory region wherein the head comprises a first track-forming portion for at least reading information from the magnetic memory region of the film, and a core having spaced areas for allowing a wire to be wound thereon, and is characterized in that:

the core has a major dimension extending in a direction which is parallel to the plane of the film.

In another aspect of the invention, there is provided a magnetic head for a camera for use with a film having a magnetic-memory region comprising a first track-forming portion for at least reading information from the magnetic-memory region of the film, and a second track-forming portion for writing information onto the magnetic-memory region of the film, characterized in that:

the first track-forming portion is arranged further from a photographic frame of the film than the second track-forming portion.

According to another aspect of the present invention there is provided a magnetic head for a camera for use with a film having a magnetic-memory region comprising a plurality of track-forming portions for at least one of reading or writing information to or from the magnetic-memory region of the film, characterized in that:

one of the track-forming portions for reading information from the magnetic-memory region of the film is arranged farther from a photographic frame of the film than the other track-forming portions.

It is an advantageous feature of the present invention to provide a magnetic head for use in a camera that provides a signal-to-noise ratio that is sufficient to guarantee reliable reading of information from the film without significantly increasing the size of the camera due to its presence.

It is a further advantageous aspect of the head design of the present invention to minimize the size of the head in the direction perpendicular to the plane of the recorded medium, so that the head will more easily fit within a camera. This is accomplished by arranging the magnetic circuit, or core, of the head so that the axis of the coils is parallel and close to the plane of the medium (the film), which is relatively unrestricted in extent. In this way, the number of turns on the coils could be increased sufficiently to provide an adequate signal to noise ratio when used as a reproduce head.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1A:
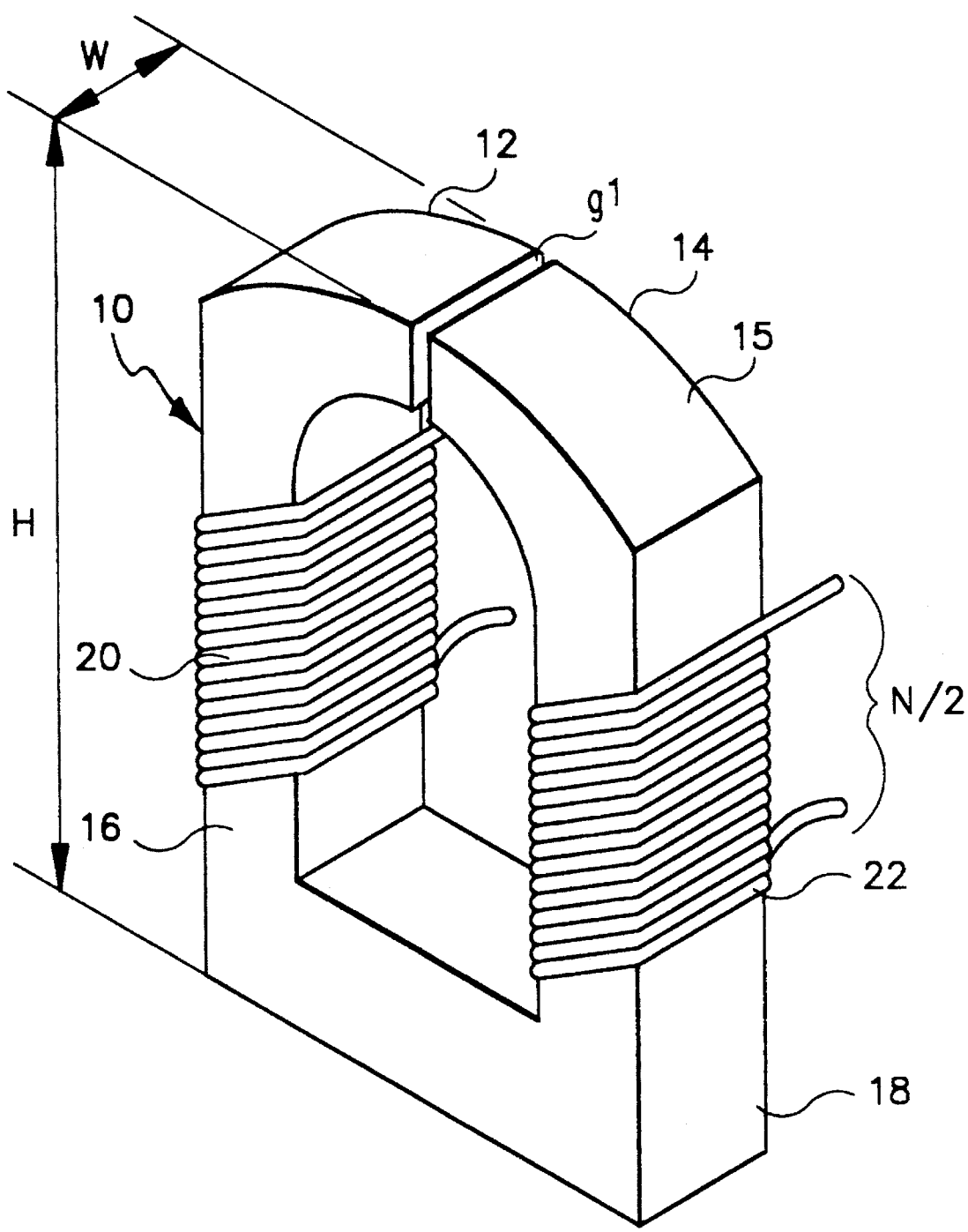
FIG. 1(a) is a perspective view of a conventional magnetic head.
Figure 1B:
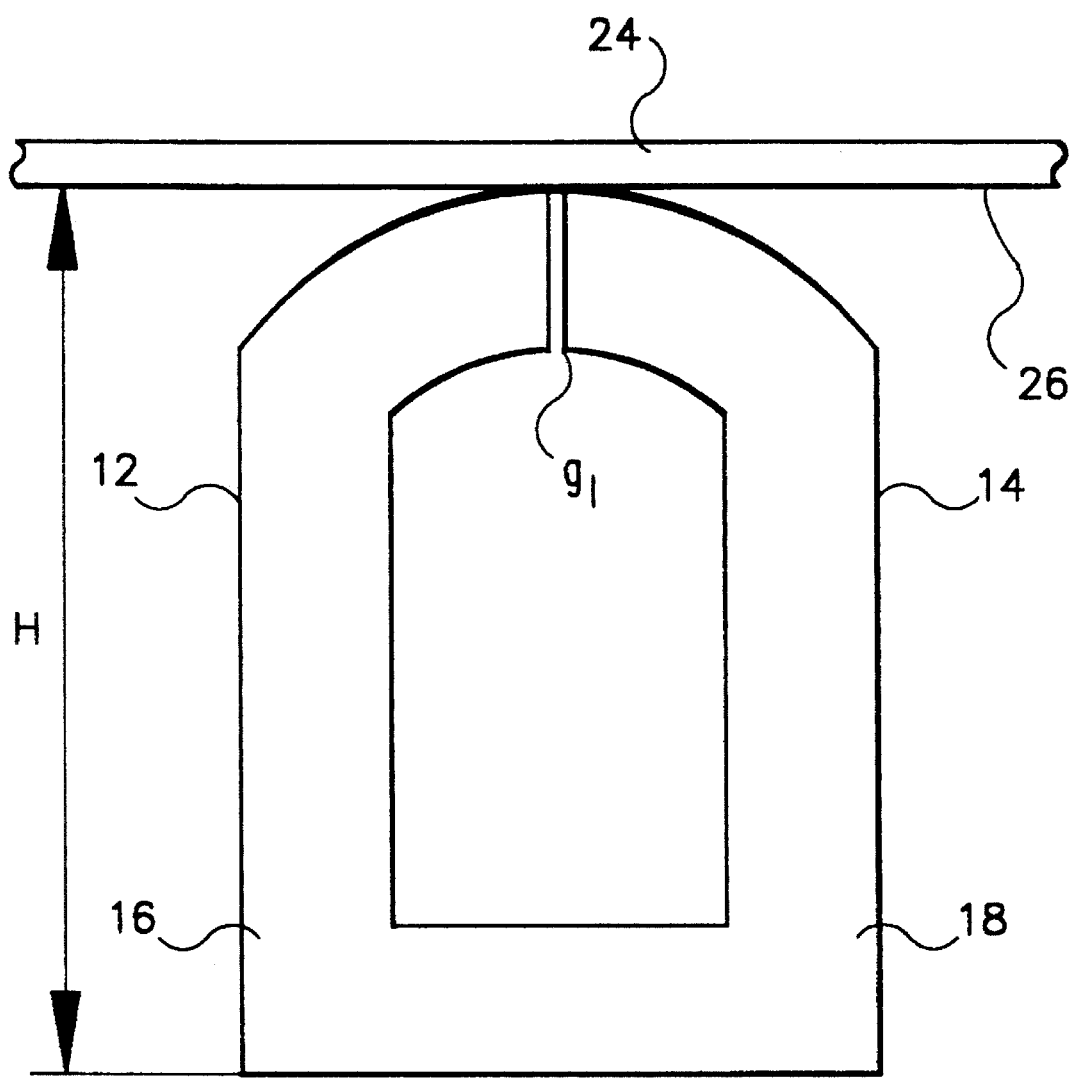
FIG. 1(b) is a schematic view of the conventional magnetic head shown in FIG. 1(a) as used with a film having a magnetic-memory portion.

Beginning with FIGS. 1(a) and 1(b), there is shown a conventional track-forming portion 10 for a magnetic head of the inductive wirewound type comprising a pair of cores 12 and 14, having spaced regions 16 and 18 onto which are wound coils 20 and 22. Each of the coils 20, 22 are shown having N/2 turns which are connected in series to achieve a total number of turns N. Such a track-forming portion 10 may be used to read information recorded on a magnetic memory portion of a film 24 in the manner shown in FIG. 1(b); wherein the portion 10 is arranged perpendicular to the plane of the film with the portion 15 of the cores 12, 14 containing the magnetic gap $g_1$ being placed in physical contact with the surface of the magnetic layer 26 of the film. The cores 12, 14 are typically made up of a material having high permeability and high saturation flux density, such as permalloy. The coils 20, 22 are attached to terminals (not shown) by which electricity is intermittently supplied, as is conventionally known.

To achieve an adequate signal to noise ratio when reading the film in a camera, a track-forming portion which has at least read capability must generally have a greater number of wire turns N wound on coils 20, 22, typically on the order of approximately 2000 turns. Even when the coils 20, 22 are wound with wire having the smallest feasible diameter (eg., 52 awg), a magnetic head using a track-forming portion 10 having coils of N turns will have a height H of approximately 8mm, as shown in FIGS. 1(a) and 1(b). The use of such a head in a camera would result in an undesirable increase in the thickness of the camera body.

Figure 2:
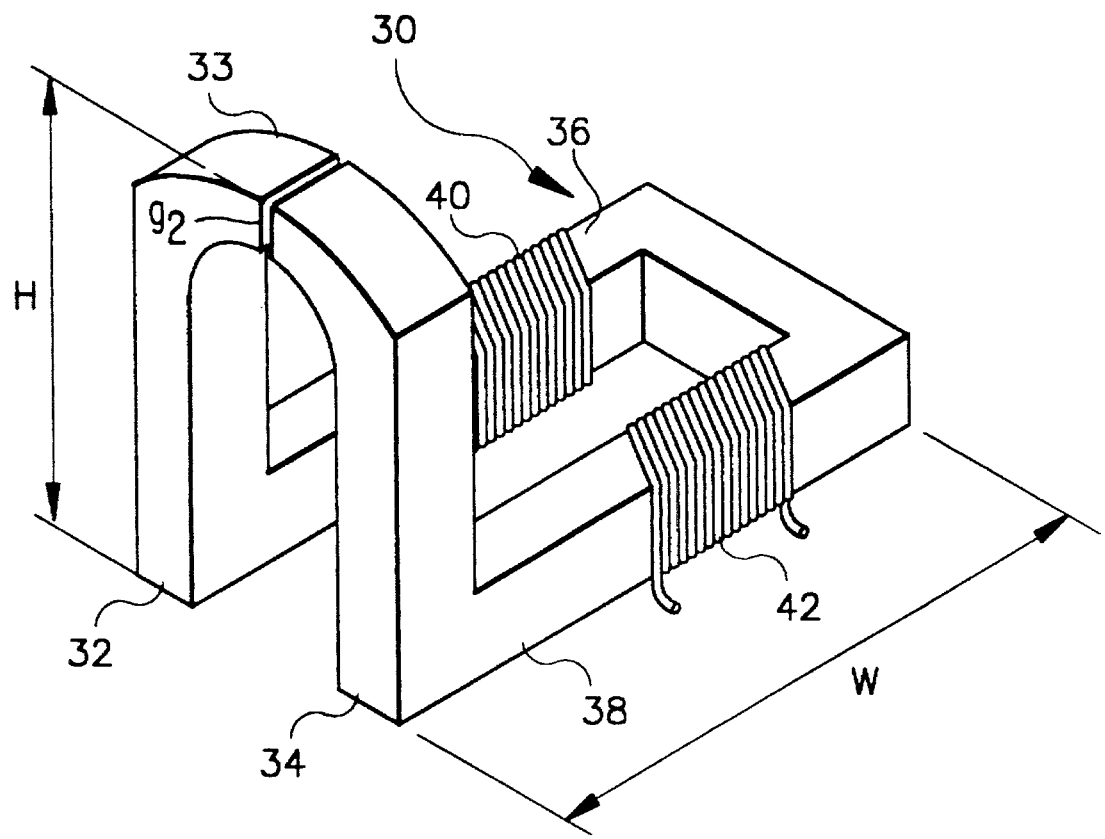
FIG. 2 is a perspective view of a portion of a magnetic head constructed in accordance with a preferred embodiment of the present invention.

Referring now to FIG. 2, a track-forming portion 30 for a magnetic head according to the present invention is now described. The track-forming portion 30 is shown having cores 32, 34 and also having a defined magnetic gap region $g_2$, as is conventional.

Figure 4:
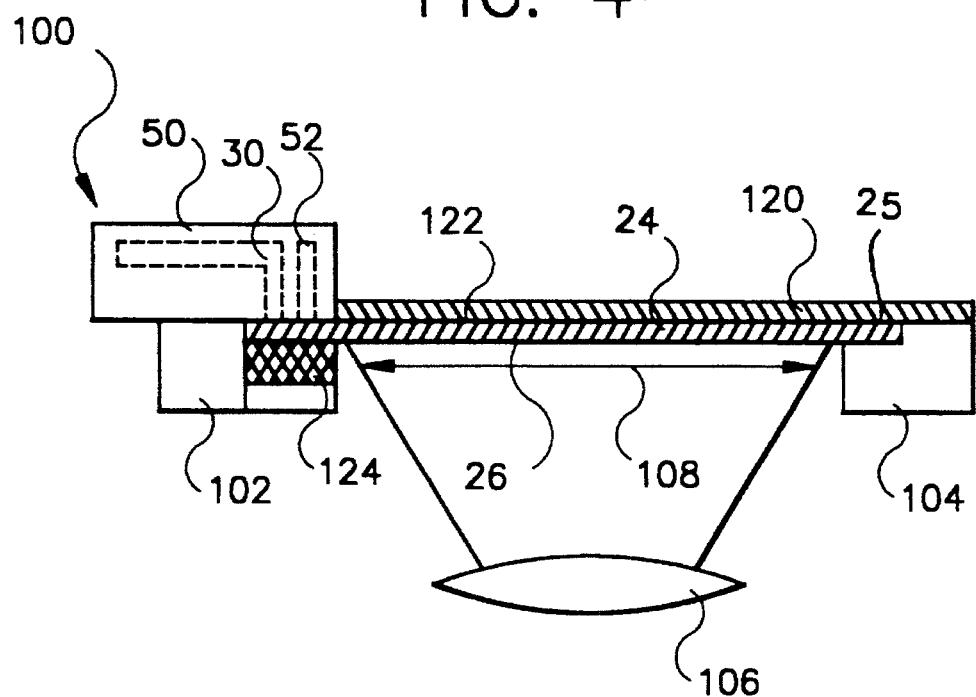
FIG. 4 is a partial side elevational view of a camera film gate using the magnetic head shown in FIGS. 2 and 3.

The track forming portion 30 is also used for at least reading and preferably for both reading and writing of information to and from the magnetic memory region of a film. As previously noted, in order to provide read capability, a higher signal output is required dictating an increased number of wire coil turns N. To provide for the increased number of coil turns required, the cores 32, 34 are made as bent workpieces, creating longer spaced regions 36, 38. The addition of this bent core configuration creates a reduced height H for a magnetic head in that the cores 32, 34 are bent through a 90 degree angle so that the longer regions 36, 38 on which the coils 40, 42 are wound are substantially parallel to the film surface plane, as shown in FIG. 4, in contrast to the conventionally described track-forming portions, such as shown in FIGS. 1(a) and 1(b). In this manner, the overall height H of a magnetic head assembly using the described track-forming portion can be reduced from about 8mm to approximately 3mm, a value which is typical of magnetic heads having only write capability. This configuration results in a minimal increase in the size of a camera body. Though this modification of the head assembly increases the overall width W, see FIGS. 1(a), 1(b), and 2, this increase does not significantly impact the size of a camera, which can more easily accommodate a magnetic head assembly having the bent-core configuration. Please note that the figures used for the height value H are merely representative of the efficiency which is achievable. It is apparent that this value can be easily varied.

Figure 3:
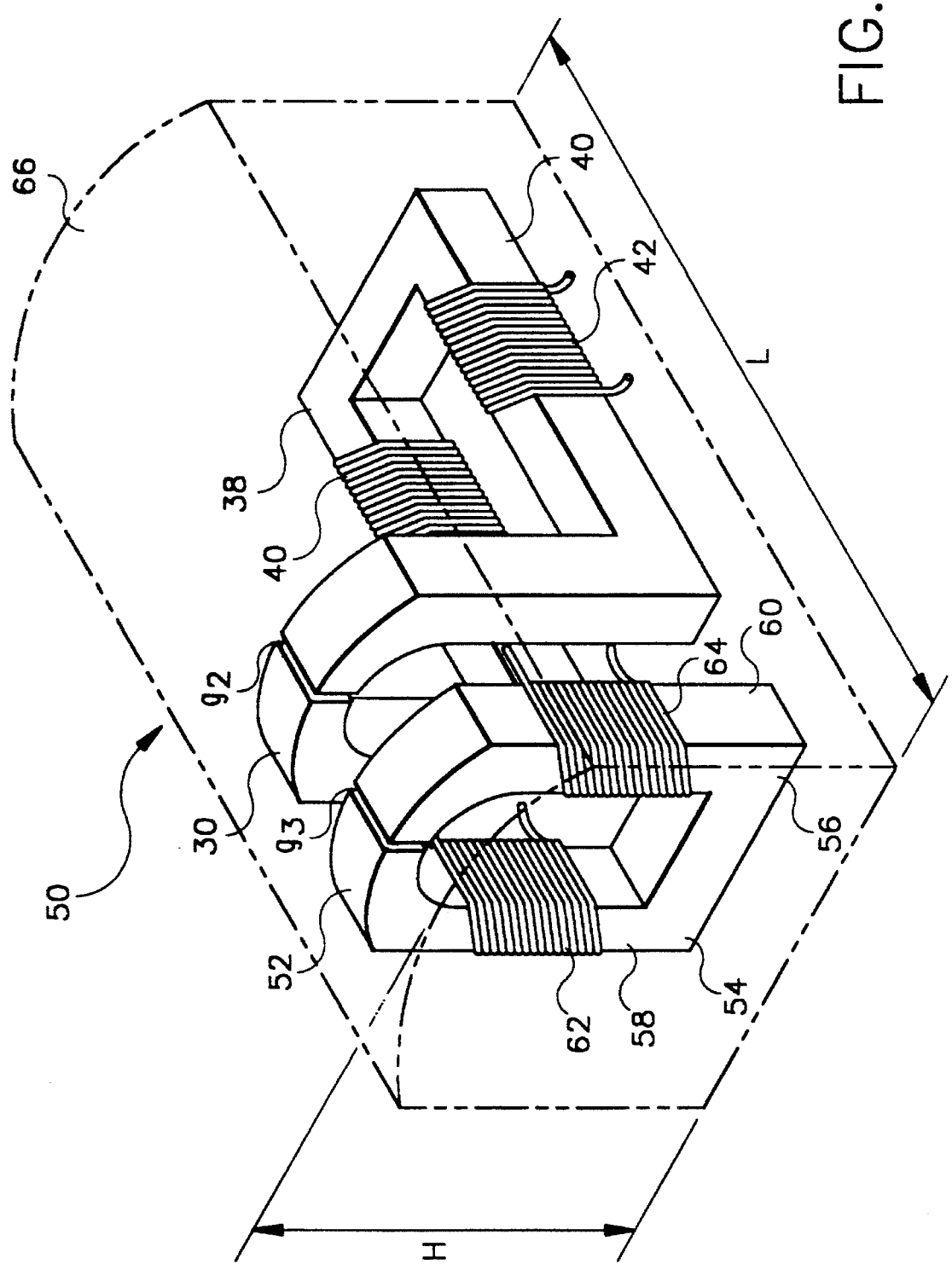
FIG. 3 is a perspective view of the remainder of the magnetic head shown in FIG. 2.

Referring to FIG. 3, there is provided a magnetic head system 50 for a camera utilizing the track-forming portion described in FIG. 2. Specifically, the magnetic head 50 contains the previously described first track-forming portion 30 as well as a second track-forming portion 52 which is capable of only writing information to the magnetic memory portion of a film. The second track-forming portion 52 is defined by cores 54 and 56 which form a magnetic gap $g_3$, each core having spaced regions 58, 60 for retaining wire wound coils 62, 64. Coils 62, 64 require having fewer turns than coils 40, 42, given that the second track-forming portion 52 does not read information from the film. Typically, approximately a total of 50-200 turns is adequate for the coils 62, 64 used in a head having a track-forming portion of this type. The orientation of the cores 54, 56 is conventional, as is shown in FIGS. 1(a) and 1(b), due to the fact that the height H of the track-forming portion is no greater than the height of the first track-forming portion 30. The track forming portion 52 is positioned adjacent track-forming portion 30.

The two track-forming portions 30, 52 are preferably housed in a case 66 formed of a non-magnetic alloy, such as aluminum, which is in turn surrounded by a high-permeability alloy, such as permalloy, to form a magnetic shield. The magnetic shield acts to minimize the coupling of electromagnetic interference generated within the camera into the coils 40, 42 of the first track-forming portion 30, thereby improving the signal-to-noise ratio.

Figure 5:
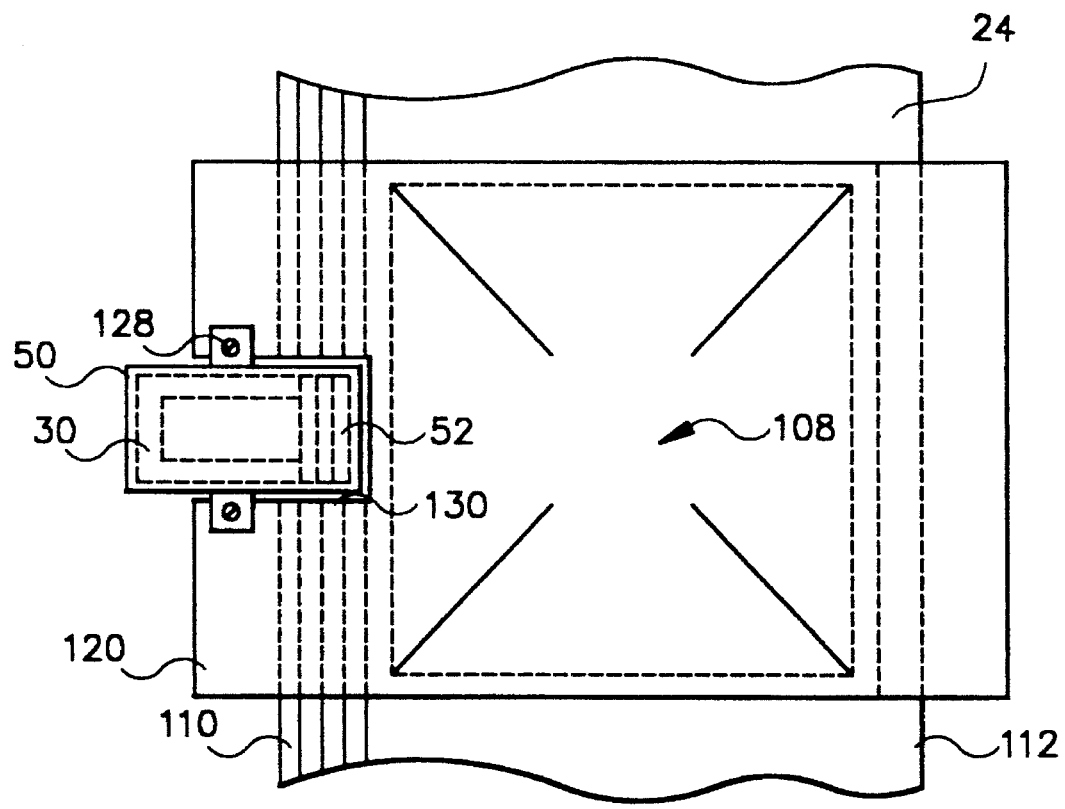
FIG. 5 is a partial plan view of the camera film gate shown in FIG. 4.

Referring to FIGS. 4 and 5, a preferred embodiment of the present invention is now described wherein the magnetic head assembly 50 is positioned within a camera loaded with film having a magnetic-memory layer. Those parts which are similar to those previously described utilize the same reference numerals for convenience.

A camera gate 100 is shown having a pair of inner rails 102, 104 that are positioned relative to a taking lens 106 in such a way that the photographic image area 108 is correctly aligned with respect to the edges 110, 112 of a film 24. The film 24, provided with a photosensitive surface 25 and a magnetic side 26, is flattened by a platen 120 to ensure that the photographic image is uniformly focused on the film's photosensitive surface.

The magnetic head 50 is attached to the platen 120 in such a way that the core portions containing the gap regions $g_2$, $g_3$ of the first and second track-forming portions 30, 52, respectively, are substantially planar with the lower surface 122 of the platen 120. In this particular embodiment, a pair of fasteners 128 are used to secure the magnetic head assembly 50 to an upper surface of the platen 120. This mounting arrangement ensures that the gap regions $g_1$, $g_2$ of each of the track-forming portions 30, 52 are in physical contact with the magnetic side 26 of the film 24, a condition that is necessary to achieve good reading and writing performance by the magnetic head. The physical contact between the track forming portions 30, 52 and the magnetic side 26 of the film 24 is further guaranteed by the provisal of a load pressure pad 124, which is positioned relative to the rail 102, so as to bear upon the photosensitive side 25 of the film 24 and thereby force the magnetic side 26 of the film against the track-forming portions 30, 52.

In order to obtain the desired planarity of the lower surfaces of the platen 120 and the magnetic head 50, a cutout portion 130 must be made in the platen. The encroachment of the cutout portion 130 into the portion of the platen 120 that is in contact with the film 24 should be as small as possible in order to minimize degradation of the flatness of the film 24 in the photographic image area 108. Such degradation could result in a loss of focus and quality over a portion of a resulting photographic image.

The described encroachment can be minimized when using the magnetic head assembly 50 herein described by arranging the long portion 36, 38 of the core of the first track forming portion 30 so that it is directed away from the image area 108 of the film 24, in a manner as shown in FIG. 4. This arrangement requires that the first track forming portion 30, that is, that portion capable of reading and writing information to and from the film magnetic side 26 be positioned furthest from the border of the photographic image area 108.

Reading is done as is conventionally known, by a magnetic flux change in the cores 32, 34 which is caused by the film 24 traveling at the magnetic gap $g_2$ which is electromagnetically transformed by means of the coils 40, 42 connected in series, to be transmitted as an electric signal to the camera via the terminals (not shown).

The invention has been described with reference to a preferred embodiment. However, it will be appreciated that variations and modifications can be effected by a person of ordinary skill in the art without departing from the scope of the invention.

PARTS LIST for FIGS. 1–5

| | |
|---|---|
| 10 | track-forming portion |
| 12 | core |
| 14 | core |
| 15 | core portion |
| 16 | spaced region |
| 18 | spaced region |
| 20 | coil |
| 22 | coil |
| 24 | film |
| 25 | photosensitive side of film |
| 26 | magnetic side of film |
| 30 | track-forming portion |
| 32 | core |
| 34 | core |
| 36 | spaced region |
| 38 | spaced region |
| 40 | coil |
| 42 | coil |
| 50 | magnetic head assembly |
| 52 | second track forming portion |
| 54 | core |
| 56 | core |
| 58 | spaced region |
| 60 | spaced region |
| 62 | coil |
| 64 | coil |
| 66 | case |
| 100 | camera film gate |
| 102 | inner rail |
| 104 | inner rail |
| 106 | taking lens |
| 108 | photographic image area |
| 110 | edge |
| 112 | edge |
| 120 | platen |
| 122 | lower surface |
| 124 | pressure pad |
| 128 | fasteners |
| 130 | cutout portion |

We claim:

1. A magnetic head for a camera for use with a moving filmstrip having a magnetic-memory region, wherein said head comprises a first track-forming portion for at least reading information from the magnetic-memory region of said filmstrip, a second track-forming portion for writing information onto the magnetic-memory region of said filmstrip, and a core having a major dimension including spaced areas for allowing wire coils to be wound thereon, is characterized in that:

the major dimension of the core extends in a direction perpendicular to the direction of travel of the moving filmstrip and is parallel to the plane of the filmstrip, wherein the first track-forming portion is positioned farther from a photographic image area of the filmstrip than the second track-forming portion.

2. A camera for use with a filmstrip having a magnetic-memory region, comprising a magnetic head having a first track-forming portion for at least reading information from the magnetic-memory region of the filmstrip, a second track-forming portion for writing information onto the magnetic-memory region and a core having spaced areas for winding wire coils, is characterized in that:

the first track-forming portion is arranged further from a photographic frame of the filmstrip than the second track-forming portion, and in which the core has a major dimension on which the wire coils are wound parallel to the plane of the filmstrip, and perpendicular to the direction of travel of the moving filmstrip.

\* \* \* \* \*